United States Patent
Sumikawa et al.

(10) Patent No.: US 11,604,074 B2
(45) Date of Patent: Mar. 14, 2023

(54) INFORMATION PROCESSING DEVICE, DATA COLLECTION SYSTEM, AND SERVER

(71) Applicant: SUBARU CORPORATION, Tokyo (JP)

(72) Inventors: Ryuichi Sumikawa, Tokyo (JP); Tomoyuki Okada, Tokyo (JP); Yosuke Takebayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 212 days.

(21) Appl. No.: 16/934,814

(22) Filed: Jul. 21, 2020

(65) Prior Publication Data
US 2021/0095981 A1 Apr. 1, 2021

(30) Foreign Application Priority Data
Sep. 26, 2019 (JP) .............................. JP2019-176138

(51) Int. Cl.
*G01C 21/34* (2006.01)
*G01C 21/36* (2006.01)
*G06Q 30/02* (2012.01)
*G06T 11/60* (2006.01)
*H04W 4/024* (2018.01)
(Continued)

(52) U.S. Cl.
CPC ..... *G01C 21/3453* (2013.01); *G01C 21/3626* (2013.01); *G06Q 30/0208* (2013.01); *G06Q 30/0215* (2013.01); *G06T 11/60* (2013.01); *G07C 5/085* (2013.01); *H04W 4/024* (2018.02);
(Continued)

(58) Field of Classification Search
CPC ............ G01C 21/3453; G01C 21/3626; G06Q 30/0208; G06Q 30/0215; G06T 11/60; G06T 11/00; G07C 5/085; G07C 5/008; H04W 4/024; H04W 4/44; G05D 1/0088; G05D 2201/0213
See application file for complete search history.

(56) References Cited

U.S. PATENT DOCUMENTS 8,996,234 B1 * 3/2015 Tamari ................. B60W 40/09
701/123
10,096,067 B1 * 10/2018 Slusar .................... G06Q 40/08

FOREIGN PATENT DOCUMENTS

JP 2005-044058 A 2/2005
JP 2005044058 A * 2/2005
(Continued)

*Primary Examiner* — Hunter B Lonsberry
*Assistant Examiner* — Paysun Wu
(74) *Attorney, Agent, or Firm* — McDermott Will & Emery LLP

(57) ABSTRACT

An information processing device to be used in a data collection system configured to collect data to be acquired during traveling of a vehicle includes a travel position setting unit, a guidance information output unit, and a data acquisition unit. The travel position setting unit is configured to set an ideal travel position for the vehicle on the basis of information of a request of a requester for collecting the data. The guidance information output unit is configured to output guidance information used to guide the vehicle on the basis of information of the ideal travel position. The data acquisition unit is configured to acquire collection data serving as the data to be collected during a period of time within which the vehicle travels in accordance with the ideal travel position.

19 Claims, 10 Drawing Sheets

(51) Int. Cl.
    *G07C 5/08*           (2006.01)
    *G05D 1/00*           (2006.01)
    *G06Q 30/0207*       (2023.01)
    *G06Q 30/0208*       (2023.01)

(52) U.S. Cl.
    CPC ... *G05D 1/0088* (2013.01); *G05D 2201/0213* (2013.01)

(56) References Cited

FOREIGN PATENT DOCUMENTS

| | | | |
|---|---|---|---|
| JP | 2018180895 A | * | 11/2018 |
| JP | 2019011015 A | * | 1/2019 |
| KR | 20150020359 A | * | 8/2013 |

* cited by examiner

INTER-VEHICLE DISTANCE IS TOO SHORT

INTER-VEHICLE DISTANCE IS TOO LONG

CHANGE IN DISPLAY IN ACCORDANCE WITH INTER-VEHICLE DISTANCE

GATE DISPLAY IN ACCORDANCE WITH APPROPRIATE INTER-VEHICLE DISTANCE

DRIVING OPERATION DISPLAY IN ACCORDANCE WITH INTER-VEHICLE DISTANCE

INFORMATION PROCESSING DEVICE, DATA COLLECTION SYSTEM, AND SERVER

CROSS-REFERENCE TO RELATED APPLICATIONS

The present application claims priority from Japanese Patent Application No. 2019-176138 filed on Sep. 26, 2019, the entire contents of which are hereby incorporated by reference.

BACKGROUND

The disclosure relates to an information processing device, a data collection system, and a server.

It has been considered so far to collect and utilize various kinds of data to be acquired during traveling of a vehicle. For example, Japanese Unexamined Patent Application Publication (JP-A) No. 2005-44058 discloses such a technology that an owner having purchased a vehicle of the same type as a vehicle that a user is considering to purchase is requested to collect travel data on a route that the user wants. The technology then allows the user to refer to collected travel data. It is therefore possible that the user who is considering to purchase the vehicle knows traveling performance of the vehicle. The technology disclosed in JP-A No. 2005-44058 further proposes provision of a reward to the owner having accepted to collect the travel data.

SUMMARY

An aspect of the disclosure provides an information processing device to be used in a data collection system configured to collect data to be acquired during traveling of a vehicle. The information processing device includes a travel position setting unit, a guidance information output unit, and a data acquisition unit. The travel position setting unit is configured to set an ideal travel position for the vehicle on the basis of information of a request of a requester for collecting the data. The guidance information output unit is configured to output guidance information used to guide the vehicle on the basis of information of the ideal travel position. The data acquisition unit is configured to acquire collection data serving as the data to be collected during a period of time within which the vehicle travels in accordance with the ideal travel position.

An aspect of the disclosure provides an information processing device to be used in a data collection system configured to collect data to be acquired during traveling of a vehicle. The information processing device is mountable in the vehicle. The information processing device includes a guidance information acquisition unit and a presentation control unit. The guidance information acquisition unit is configured to acquire guidance information used to guide the vehicle. The guidance information is based on information of an ideal travel position set on the basis of information of a request of a requester for collecting the data. The presentation control unit is configured to present the guidance information acquired by the guidance information acquisition unit.

An aspect of the disclosure provides a data collection system configured to collect data to be acquired during traveling of a vehicle. The data collection system includes a management server and an information processing device mountable in the vehicle. The management server includes a data acquisition unit, a guidance information output unit, and a storage. The data acquisition unit is configured to acquire information of a request of a requester for collecting the data. The guidance information output unit is configured to transmit, to the information processing device, information of an ideal travel position for the vehicle. The ideal travel position is set on the basis of the information of the request for collecting the data. The storage is configured to store collection data to be transmitted from the vehicle. The information processing device includes a guidance information acquisition unit, a presentation control unit, and a transmission control unit. The guidance information acquisition unit is configured to acquire the information of the ideal travel position. The presentation control unit is configured to present guidance information used to guide the vehicle on the basis of the information of the ideal travel position. The transmission control unit is configured to transmit, to the management server, the collection data serving as the data to be collected during a period of time within which the vehicle travels in accordance with the ideal travel position.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
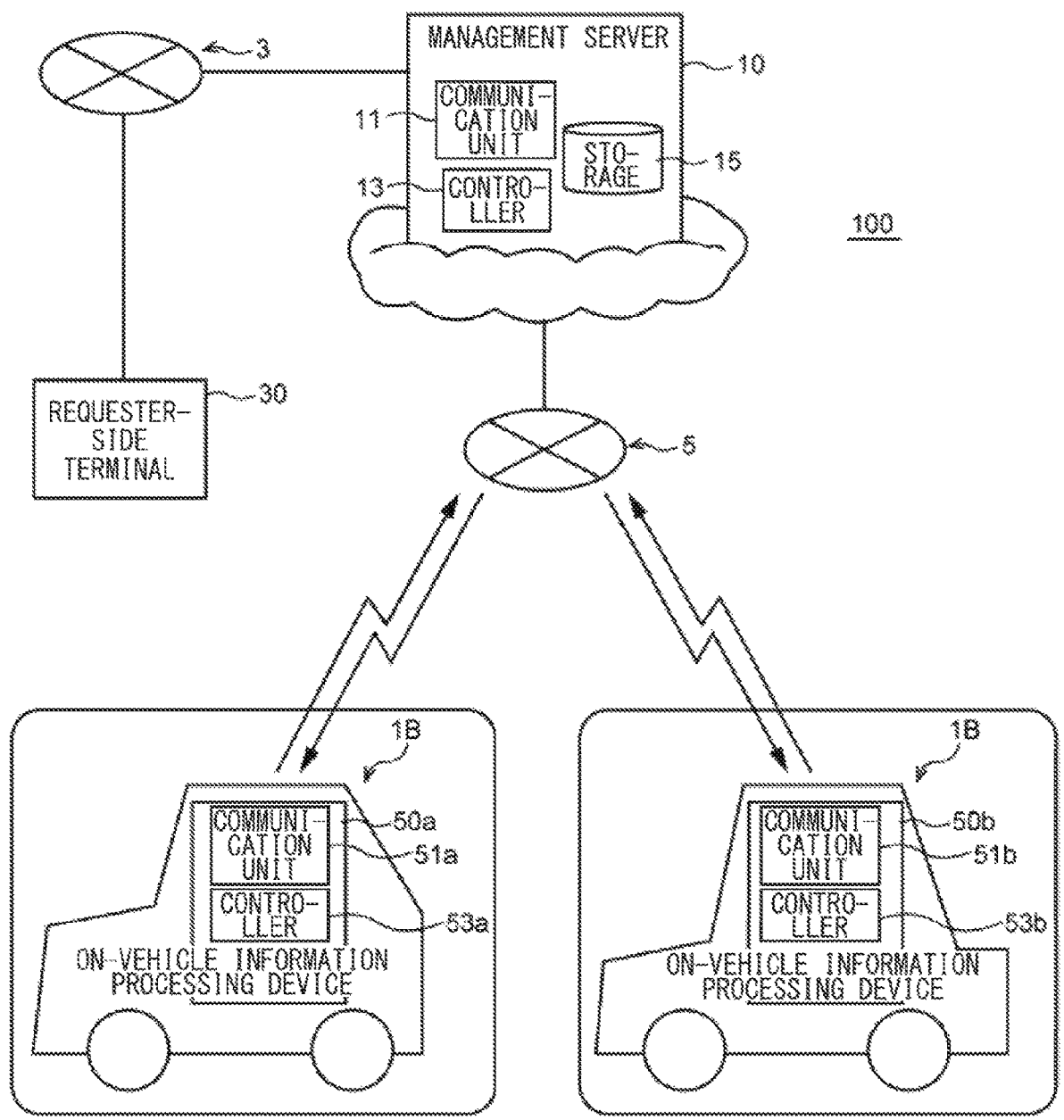
FIG. 1 is a schematic view of a data collection system according to one example embodiment of the disclosure, illustrating an outline configuration example.

As recent utilization of big data has exemplified, data to be collected varies in kind. It is therefore not so easy to request an owner of a vehicle to collect such various kinds of data. To deal with this issue, it would be conceivable that encouraging the owner of the vehicle to actively collect desired data increases data collection efficiency.

It is desirable to provide an information processing device, a data collection system, and a server that make it possible to increase efficiency of collecting data satisfying a request of a requester.

In the following, some example embodiments of the disclosure are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[1. Outline Configuration of Data Collection System]

An outline configuration of a data collection system according to one example embodiment of the disclosure will now be described with reference to FIG. 1. FIG. 1 is a schematic view of a data collection system 100 according to the example embodiment, illustrating an outline configuration example. The data collection system 100 may include on-vehicle information processing devices 50a and 50b, a management server 10, and a requester-side terminal 30. The on-vehicle information processing devices 50a and 50b may respectively be used in vehicles 1A and 1B. The vehicles 1A and 1B may be four-wheeled vehicles, for example. The management server 10 may be configured to communicate with the on-vehicle information processing devices 50a and 50b. In the data collection system 100 according to the example embodiment, the management server 10 may serve as an information processing device according to at least one embodiment of the disclosure. Unless otherwise particularly distinguished from each other, the vehicles 1A and 1B and the on-vehicle information processing devices 50a and 50b may be respectively collectively referred to as a "vehicle 1" and an "on-vehicle information processing device 50". For ease of understanding the disclosure, the two vehicles 1A and 1B may be illustrated and described. However, the number of vehicles to be coupled to the management server 10 may not be limited to two. The number of such vehicles may not be limited.

In the data collection system 100 according to the example embodiment, a requester who wants to collect desired data may transmit a request for collecting data to the management server 10, via the requester-side terminal 30. The management server 10 may then transmit, to the vehicle 1, information used to guide the vehicle to collect data satisfying the request. Data collected in the vehicle 1 having accepted the request for collecting data may be transmitted to the management server 10. The data may then be provided to the requester. As the vehicle 1 collects the data satisfying the request, and transmits the data to the management server 10, a reward may be provided to the vehicle 1 or an occupant of the vehicle 1. Such an occupant may be hereinafter also referred to as an "acceptor".

Non-limiting examples of data that a requester wants to collect may include conditions of road surfaces, such as rutting, degradation, and unevenness. Non-limiting examples of such data may as well include lateral force or tire force acting to the vehicle making a lane change. Such data may be estimated on the basis of, for example, detection data of a tire force sensor provided on an axle with wheels and detection data of an acceleration sensor provided in the vehicle 1. Such detection data may be detected during traveling of the vehicle 1 and when the vehicle 1 makes a lane change, for example. A requester provided with data of conditions of road surfaces, such as rutting, degradation, and unevenness may, for example, reflect the data to information used for road maintenance purposes. Such a requester may as well reflect the data in creating a program regarding a plan for traveling by automated driving. A requester provided with data of a lateral force or a tire force acting to the vehicle making a lane change may, for example, reflect the data in designing of tires.

Non-limiting examples of data that a requester wants to collect may further include air resistance and aerodynamic characteristics of a vehicle body. Vehicle speed and acceleration to be acquired with regard to an output of an engine or a drive motor configured to drive a vehicle may be affected by air resistance of a vehicle body, road resistance due to gradient, loss in transmission of driving force, and road surface friction, for example. Such data of air resistance of a vehicle body may therefore be estimated on the basis of information including, for example, vehicle speed and detection data of an acceleration sensor, output of an engine or a drive motor configured to drive a vehicle, road conditions including road resistance due to gradient and road surface friction, loss in transmission of driving force, and vehicle type including tire type. Such aerodynamic characteristics may also be estimated by taking into account, for example, differences in body shape of the vehicle body and differences in attached parts among vehicles that are the same in type, in addition to air resistance of the vehicle body. A requester provided with data of air resistance or aerodynamic characteristics of a vehicle body may, for example, reflect the data in designing of vehicle bodies.

Non-limiting examples of data that a requester wants to collect may further include information of emotional and biological conditions of an occupant or a driver. Such data may be estimated on the basis of, for example, detection data of a biological sensor provided in a cabin and data of images captured by a camera, in various traveling states of the vehicle 1. A requester provided with data of information of emotional or biological conditions of an occupant may, for example, reflect the data in creating a program regarding a plan for traveling by automated driving. A requester provided with data of information of emotional or biological conditions of a driver may, for example, utilize the data to know conditions of the driver in a predetermined traveling state.

Types of collection data and utilization purposes of the collection data may not be limited to the examples described above.

Rewards may be represented in a form of, for example, money, virtual currency, points, or services. Types of rewards may not however be particularly limited. A reward to be set may vary in accordance with, for example, an amount of collected data, a period of time within which data is collected, and accuracy in collecting data. A reward may be set upon a request of a requester for collecting data. A reward may be set beforehand.

(Requester-Side Terminal)

The requester-side terminal 30 may be a device with which a requester performs an input operation for transmitting a request for collecting data to the management server 10. The requester-side terminal 30 may, for example, be configured to communicate with the management server 10, via a wired or wireless communication network 3 such as the Internet. Non-limiting examples of the requester-side terminal 30 may include personal computers and touch panels. However, the requester-side terminal 30 may not be limited to the examples. A request for collecting data may not be made via a communication network. For example, a requester may provide data that the requester wants to collect orally, in a written form, or in a form of electronic file to an administrator of the management server 10. In this case, the administrator may enter, into the management server 10, a content of the data that the requester wants to collect.

(Management Server)

The management server 10 may serve as an information processing device according to at least one embodiment of the disclosure. The management server 10 may be configured to communicate with each of the vehicles 1 via a wireless communication network 5 using mobile communications, for example. The management server 10 may, for example, be a cloud server. The communication network 3 coupling the requester-side terminal 30 and the management server 10 may also take a role of the wireless communication network 5. In one embodiment, the management server 10 may serve as a "server".

The management server 10 may be further configured to set, upon reception, from the requester-side terminal 30, of a request for collecting data, an ideal travel position in accordance with the data to be collected. The management server 10 may be further configured to generate information used to guide the vehicle 1, on the basis of information of the ideal travel position. The information may be hereinafter also referred to as "guidance information". The management server 10 may be further configured to then transmit the guidance information to the vehicle 1. The management server 10 may be further configured to acquire travel data to be transmitted from the vehicle 1 having accepted the request. The collected data may be provided to the requester via the requester-side terminal 30 or with an appropriate method.

The management server 10 may be further configured to perform processing of providing a reward to the vehicle 1 or the acceptor having collected the data. The management server 10 may be further configured to transmit reward information along with transmission, to the vehicle 1, of guidance information used to guide the vehicle 1 to an ideal travel position.

(On-Vehicle Information Processing Device)

The on-vehicle information processing device 50 used in the vehicle 1 may be configured to communicate with the management server 10 via the wireless communication network 5. The on-vehicle information processing device 50 may be further configured to transmit, to the management server 10, information of a current position and a vehicle type of the vehicle 1. The on-vehicle information processing device 50 may be further configured to present, to the driver of the vehicle 1, information to be transmitted from the management server 10. The information may be used to guide the vehicle 1 to an ideal travel position. The on-vehicle information processing device 50 may be further configured to transmit, to the management server 10, data to be collected during a period of time within which the vehicle 1 travels in accordance with the ideal travel position, in addition to identification information of the vehicle 1. The on-vehicle information processing device 50 may not be limited to an electronic control device mounted in the vehicle 1. The on-vehicle information processing device 50 may be a smartphone possessed by or a wearable terminal worn by a user, for example. In one embodiment, the on-vehicle information processing device 50 may serve as an "information processing device".

Allowing the driver of the vehicle 1 to collect desired data while the driver drives the vehicle 1 in accordance with guidance information presented by the on-vehicle information processing device 50 makes it possible to encourage the driver to actively collect data. Presenting reward information, in addition to guidance information, to allow the driver of the vehicle 1 to see a reward to be acquired, and to collect desired data makes it further possible to encourage the driver to actively collect data.

[2. Configuration Example of Management Server]

Figure 2:
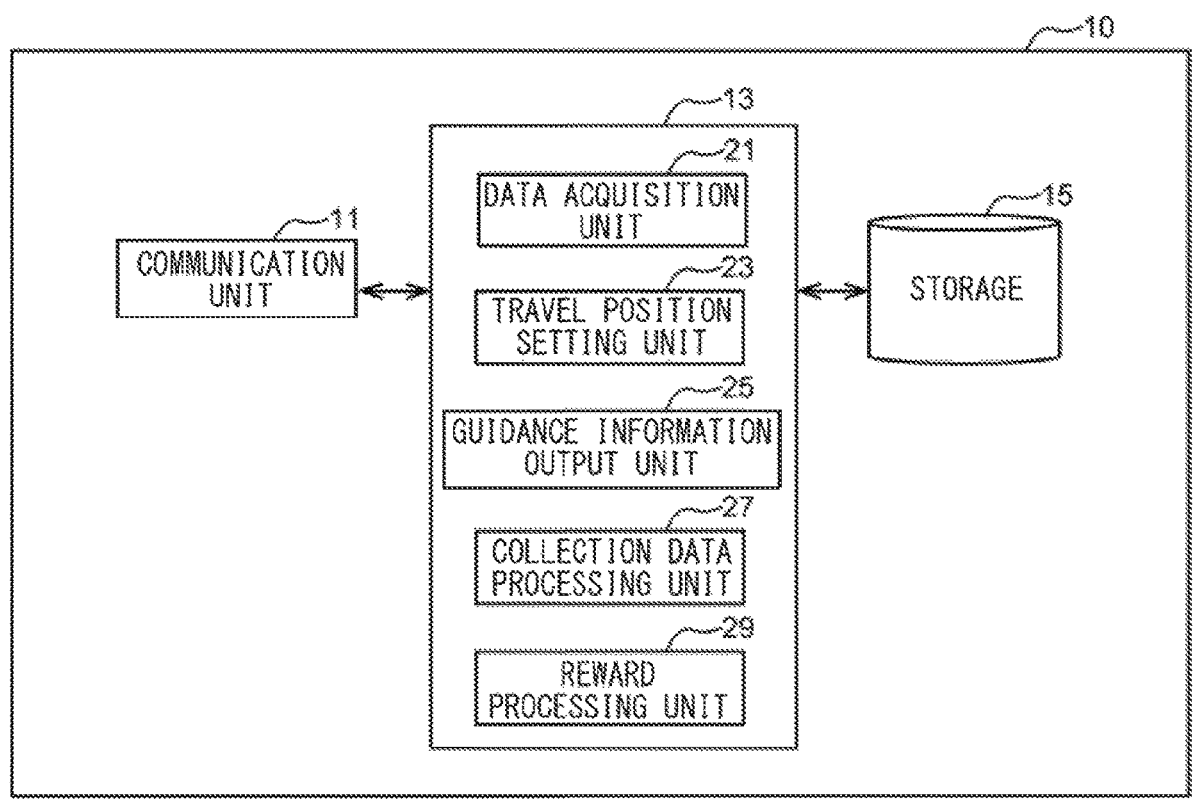
FIG. 2 is a block diagram of a management server according to the example embodiment, illustrating a configuration example.

Next, a specific but non-limiting configuration example of the management server 10 serving as an information processing device according to the example embodiment will now be described with reference to FIG. 2. FIG. 2 is a block diagram of the management server 10, illustrating a configuration example.

The management server 10 may include a communication unit 11, a controller 13, and a storage 15. In the example embodiment, the communication unit 11 may include an interface configured to perform communications with at least the wireless or wired communication network 3 and the wireless communication network 5. The management server 10 may be configured to communicate, via the communication unit 11, with the on-vehicle information processing devices 50 of a plurality of vehicles 1 and the requester-side terminal.

The storage 15 may include a storage medium such as a hard disk drive (HDD), a compact disc (CD), a digital versatile disc (DVD), a solid state drive (SSD), a universal serial bus (USB) flash memory, or a storage device. The storage 15 may not be particularly limited in kind. The storage 15 may be configured to store collection data to be transmitted from the on-vehicle information processing device 50 or the on-vehicle information processing devices 50 mounted in the vehicle 1 or the plurality of vehicles 1 in which an automated driving control may be executable.

The controller 13 may include a processor such as a central processing unit (CPU). The controller 13 may partially or wholly be updatable firmware, for example. The controller 13 may otherwise partially or wholly be a program module to be executed under an instruction to be provided from a CPU, for example. The controller 13 may include a data acquisition unit 21, a travel position setting unit 23, a guidance information output unit 25, a collection data processing unit 27, and a reward processing unit 29. The components described above may be achieved upon execution of a program by the processor.

The data acquisition unit 21 may be configured to acquire information of a request for collecting desired data, after the request has been transmitted from the requester-side terminal 30. As described above, information of a request for collecting data may include information of a type of data that a requester wants to collect. Information of a request for collecting data may further include information regarding conditions for collecting data. Non-limiting examples of conditions for collecting data may include information of at least one of position, region, section, period of time, amount, season, and weather, under which data is to be collected. Non-limiting examples of conditions for collecting data may further include travel conditions of the vehicle 1 when the vehicle 1 collects data. Non-limiting examples of travel conditions of the vehicle 1 may include vehicle type, vehicle speed, attributes of a driver such as gender, age, and years of experience after the driver acquired the driving license. Non-limiting examples of travel conditions of the vehicle 1 may as well include specifications of sensors provided in the vehicle 1. In the example embodiment, information of a request for collecting data may include information of a reward to an acceptor having collected data.

The data acquisition unit 21 may be further configured to acquire vehicle information to be transmitted from the on-vehicle information processing device 50 of each of the vehicles 1. Vehicle information may be information regarding current driving conditions of each of the vehicles 1. Non-limiting examples of vehicle information may include information of at least one of vehicle type, current position, attributes of a driver, and specifications of sensors. Allowing the management server 10 to acquire vehicle information makes it possible to select at least one of the vehicles 1, to which a request for collecting data is to be transmitted, in accordance with data that a requester wants to collect. It is therefore possible to efficiently collect data.

The data acquisition unit 21 may be further configured to acquire collection data transmitted from the on-vehicle information processing device 50 of the vehicle 1 of each acceptor having accepted to collect data. The acquired collection data may be stored in the storage 15. The collection data may be detection data detected by various kinds of sensors provided in the vehicle 1. The collection data may otherwise be data converted into desired data (of degree of rutting or degradation of a road or air resistance, for example) in the on-vehicle information processing device 50 on the basis of the aforementioned detection data.

The travel position setting unit 23 may be configured to set, on the basis of acquired information of a request for collecting data, an ideal travel position for each of the vehicles 1, to which a request for collecting data is to be transmitted, in accordance with the request for collection data that a requester desires. The travel position setting unit 23 may be further configured to identify, on the basis of vehicle information acquired from each of the vehicles 1, at least one of the vehicles 1, to which a request for collecting data is to be transmitted, in accordance with a content of data to be collected. The travel position setting unit 23 may be further configured to then set an ideal travel position for each of the vehicles 1.

In a case where data that a requester wants to collect is information of conditions of road surfaces including rutting, degradation, and unevenness, or lateral force or tire force acting to a vehicle making a lane change, an ideal travel position may represent a travel position within a lane or respective travel positions within a plurality of lanes, for example. In a case where data that a requester wants to collect includes air resistance or aerodynamic characteristics of a vehicle body, an ideal travel position may represent a travel position spaced a predetermined inter-vehicle distance with respect to a preceding vehicle, for example. In a case where data that a requester wants to collect includes information of emotional or biological conditions of an occupant or a driver in a vehicle spaced a predetermined inter-vehicle distance, an ideal travel position may represent a travel position spaced the predetermined inter-vehicle distance with respect to a preceding vehicle.

An ideal travel position may not be limited to the examples described above. The travel position setting unit 23 may be further configured to appropriately set an ideal travel position, in accordance with data that a requester wants to collect.

The guidance information output unit 25 may be configured to transmit, to the on-vehicle information processing device 50 of the vehicle 1, guidance information used to guide the vehicle 1 to which a request for collecting data is to be transmitted to the ideal travel position on the basis of information of the set ideal travel position. In the example embodiment, guidance information may represent information used to display in an augmented reality (AR) manner an ideal travel position within a field of vision of a driver. Guidance information may also represent control information for a head-up display (HUD) device mounted in the vehicle 1. Guidance information may however be not limited to control information for the HUD device. Guidance information may represent control information for a display panel of a navigation system mounted in the vehicle 1. Guidance information may otherwise represent control information used to notify an ideal travel position via voice or a lamp that comes on.

The guidance information output unit 25 may be further configured to first transmit a request for collecting data to the vehicle 1 to which collection of data is to be requested. The guidance information output unit 25 may be further configured to start to transmit guidance information, upon reception, from the vehicle 1, of a signal indicative of acceptance of the request for collecting data.

In the example embodiment, the guidance information output unit 25 may be further configured to cause the vehicle 1 to present reward information as guidance information. Such presentation allows the driver to directly know a reward to be acquired, making it possible to encourage the driver to actively collect data. In a specific but non-limiting example, the guidance information output unit 25 may be further configured to display in an AR manner reward information, on an ideal travel position within the field of vision of the driver. Such display allows the driver to see rewards and collect data while the driver keeps driving with his or her line of sight kept in a similar manner to a normal driving state.

The collection data processing unit 27 may be configured to perform processing to store, in the storage 15, collection data to be transmitted from the vehicle 1. In a case where collection data to be transmitted from the vehicle 1 represents detection data of various kinds of sensors, the collection data processing unit 27 may be further configured to perform processing to convert the detection data into data that a requester wants. The processing to store collection data in the storage 15 may be collectively performed at one time upon completion of collection of the data by the vehicle 1. The processing to store collection data in the storage 15 may otherwise be performed sequentially or per predetermined processing cycle.

The reward processing unit 29 may be configured to perform processing to provide a reward to an acceptor having caused the vehicle 1 to collect data. The reward processing unit 29 may be further configured to refer to a reward being set by a requester or being set beforehand. The reward processing unit 29 may be further configured to provide the reward to the acceptor, in accordance with the collected data. The method of providing a reward may not be particularly limited. For example, the reward processing unit 29 may be further configured to deposit a reward in a form of money, virtual currency, or points in a preliminarily registered account of an acceptor. The reward processing unit 29 may otherwise be further configured to grant a right to receive a predetermined service to be provided. The reward processing unit 29 may be further configured to provide a reward each time collection data transmitted from the vehicle 1 is acquired. The reward processing unit 29 may otherwise be further configured to provide a reward upon completion of collection of data.

[3. Configuration Example of On-Vehicle Information Processing Device]

Figure 3:
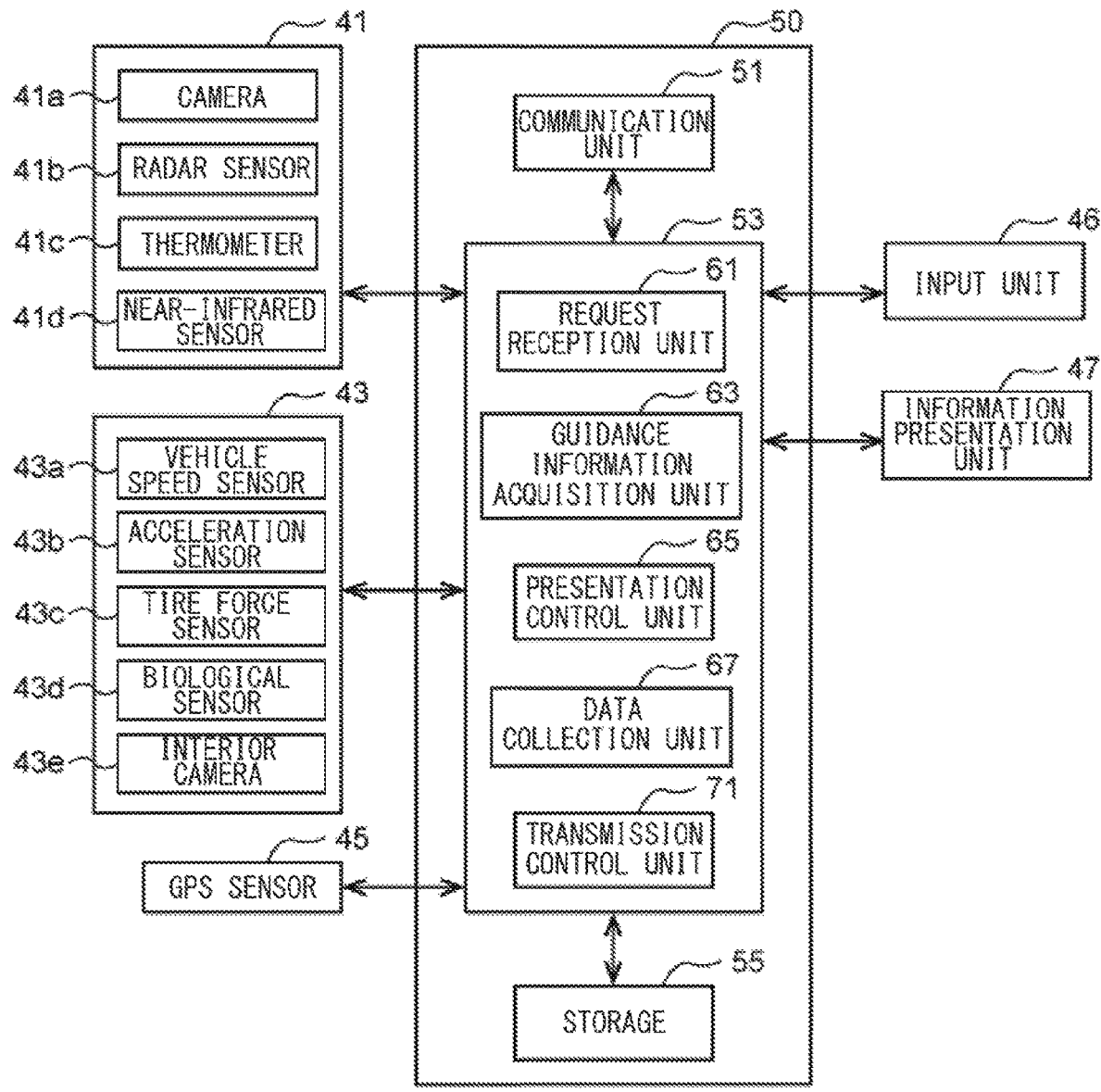
FIG. 3 is a block diagram of an on-vehicle information processing device according to the example embodiment, illustrating a configuration example.

Next, a specific but non-limiting configuration example of the on-vehicle information processing device 50 according to the example embodiment will now be described with reference to FIG. 3. FIG. 3 is a block diagram of the on-vehicle information processing device 50 according to the example embodiment, illustrating the configuration example.

The on-vehicle information processing device 50 may include, for example, a processor such as a CPU or a micro processing unit (MPU), an electric circuit, and a storage device such as a random access memory (RAM) and a read only memory (ROM). The on-vehicle information processing device 50 may partially or wholly be updatable firmware, for example. The on-vehicle information processing device 50 may otherwise partially or wholly be a program module to be executed under an instruction to be provided from a CPU, for example.

The on-vehicle information processing device 50 may include a communication unit 51, a controller 53, and a storage 55. The controller 53 may include a transmission control unit 71, a request reception unit 61, a guidance information acquisition unit 63, a presentation control unit 65, and a data collection unit 67. The controller 53 may be a processor such as a CPU, for example. The request reception unit 61, the guidance information acquisition unit 63, the presentation control unit 65, and the data collection unit 67 may be achieved upon execution of a program by the processor. The storage 55 may include one or a plurality of storage devices such as RAMs and ROMs.

The on-vehicle information processing device 50 may be configured to acquire, directly or via a communication bus such as a controller area network (CAN), information detected by an ambient environment detection sensor group 41, a vehicle condition detection sensor group 43, and a global positioning system (GPS) sensor 45. The GPS sensor 45 may be configured to receive a positioning signal from a satellite included in a global positioning system. The GPS sensor 45 may be further configured to transmit the positioning signal to the on-vehicle information processing device 50.

The ambient environment detection sensor group 41 may include one or a plurality of sensors used to detect an ambient environment of the vehicle 1. Non-limiting examples of the ambient environment detection sensor group 41 may include a camera 41a, a radar sensor 41b, a thermometer 41c, and a near-infrared sensor 41d. In the ambient environment detection sensor group 41, one or more of the sensors may be omitted. Another sensor than the sensors may be included. For example, the ambient environment detection sensor group 41 may include a light detection and ranging/laser imaging detection and ranging (LIDAR) sensor.

The vehicle condition detection sensor group 43 may include one or a plurality of sensors each configured to detect various kinds of conditions regarding the vehicle 1. Non-limiting examples of the vehicle condition detection sensor group 43 may include a vehicle speed sensor 43a, an acceleration sensor 43b, a tire force sensor 43c, a biological sensor 43d, and an interior camera 43e. In the vehicle condition detection sensor group 43, one or more of the sensors may be omitted. Another sensor than the sensors may be included.

Furthermore, the on-vehicle information processing device 50 may be coupled, directly or via a communication bus such as a CAN, to an input unit 46 and an information presentation unit 47. The input unit 46 may be configured to receive an input operation performed by a user such as an occupant onto the on-vehicle information processing device 50. The input unit 46 may be, for example, a touch panel display or a dial operation device. The input unit 46 may otherwise be a microphone configured to receive a voice entry from a driver or an occupant. The input unit 46 may also be a camera configured to receive a gesture entry.

The information presentation unit 47 may be configured to present, to the driver, guidance information used to guide the vehicle 1 to an ideal travel position. The information presentation unit 47 may be, for example, a display panel provided on a dashboard or an HUD device configured to perform projection onto a windshield. The information presentation unit 47 may thus display an image viewable by an occupant. In the example embodiment, the information presentation unit 47 may be an HUD device configured to display in a superimposed and AR manner an image within the field of vision of the driver. The HUD device may thus take a role of the information presentation unit 47.

The information presentation unit 47 may not be however limited to such a display panel or an HUD as described above. To present guidance information to a driver via sound or voice, a loudspeaker serving as the information presentation unit 47 may be used, for example.

The communication unit 51 of the on-vehicle information processing device 50 may serve as an interface configured to perform communications with a device outside of the vehicle 1. The communication unit 51 may at least include an interface for mobile communications. The communication unit 51 may further include an interface for short-range communications or communications through beacons, for example.

The request reception unit 61 may be configured to receive information, transmitted from the management server 10, of a request for collecting data. The request reception unit 61 may be further configured to notify the information to the driver or an occupant, for example. The notification method may not be particularly limited. For example, a request for collecting data, when arises, may be indicated on a display or may be provided via voice. In a case where a driver or an occupant having been notified about a request for collecting data intends to accept the request, the driver or the occupant may perform an input operation, via the input unit 46, to accept the request.

The guidance information acquisition unit 63 may be configured to acquire guidance information to be transmitted from the management server 10. In the example embodiment, as described above, guidance information may include information of an ideal travel position for the vehicle 1, information regarding conditions for collecting data, and reward information.

The presentation control unit 65 may be configured to control the information presentation unit 47 on the basis of guidance information received from the management server 10 to guide the vehicle 1 to an ideal travel position. In the example embodiment, the presentation control unit 65 may be further configured to control the information presentation unit 47 to display in a superimposed manner information of an ideal travel position for the vehicle 1 within the field of vision of the driver. A specific but non-limiting example of the presentation method will be described later in detail.

The data collection unit 67 may be configured to collect various kinds of data based on sensor signals to be transmitted from the ambient environment detection sensor group 41, the vehicle condition detection sensor group 43, and the GPS sensor 45. The data collection unit 67 may be further configured to collect, as information of an ambient environment, information of at least one of recognized objects including other vehicles, bicycles, pedestrians, and obstacles, numbers, relative speeds, and distances of the recognized objects, brake signals, lane on which the vehicle itself is traveling, traffic signs, and material, unevenness, moisture percentage, and temperature of road surface, for example. The data collection unit 67 may be further configured to collect, as vehicle conditions, information of at least one of vehicle speed, longitudinal acceleration, lateral acceleration, yaw rotation, roll rotation, tire force, and information of emotional or biological conditions of a driver and an occupant, for example. The data collection unit 67 may be further configured to collect positional information of the vehicle 1 on a map on the basis of a sensor signal of the GPS sensor 45.

Note that data to be collected may include other information than the example information described above. The method of detecting the exemplified information of an ambient environment may be a known method. Its detailed description is thus omitted.

The data collection unit 67 may be further configured to continuously collect all kinds of data. The data collection unit 67 may otherwise be further configured to collect only data necessary for data that a requester wants. In a case of collecting all kinds of data, the data collection unit 67 may be further configured to select or generate data that a requester wants, on the basis of collected data.

The data collection unit 67 may be further configured to count rewards acquired during a period of time within which the vehicle 1 collects data. The data collection unit 67 may be further configured to count an amount of rewards themselves or points acquired through collection of data. The data collection unit 67 may otherwise be further configured to count a rough amount of rewards acquired during a period of time within which data is to be collected.

The transmission control unit 71 may be configured to transmit, to the management server 10, various kinds of information via the wireless communication network 5. For example, the transmission control unit 71 may transmit, to the management server 10, such vehicle information as described above to notify information of the vehicle itself to the management server 10. The transmission control unit 71 may be further configured to transmit, in a case where a driver or an occupant having received a request for collecting data has performed an input operation of accepting the request, a signal indicative of the acceptance of the request to the management server 10. The transmission control unit 71 may be further configured to transmit, to the management server 10, data collected by the data collection unit 67 and information of counted rewards.

[4. Examples of Presentation Controls and Determination of Acquisition of Rewards]

Next, some example presentation controls to be performed by the presentation control unit 65 will now be described. An example of how the data collection unit 67 determines that a reward is acquired will also be described. In the example presentation controls described below, the presentation control unit 65 may display in a superimposed manner, as information used to guide the vehicle 1 to an ideal travel position, reward information within the field of vision of the driver.

[4.1. Example of Guidance to Ideal Travel Positions on Multiple Lanes]

As described above, it may be necessary that a travel position of the vehicle 1 be guided to an appropriate position within a road, or that a driver be encouraged to make a lane change, in a case where data that a requester wants to collect is data of rutting, degradation, or unevenness of the road, or otherwise is data of tire force acting to the vehicle making a lane change, for example. FIGS. 4 to 11 illustrate example presentations in a case where the vehicle 1 traveling on a road separated into a plurality of lanes is guided to a desired lane.

Figure 4:
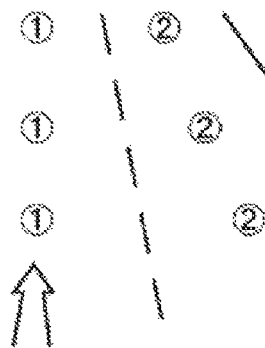
FIG. 4 is an explanatory diagram of an example where coins that vary in points are displayed in a superimposed manner on lanes to guide a vehicle.

FIG. 4 illustrates an example where coins that vary in points are displayed in a superimposed manner on a lane to guide the vehicle 1. In the example illustrated in FIG. 4, points representing rewards to be acquired in a case where the vehicle keeps traveling on a current lane may be displayed in a superimposed manner on the lane per reward acquisition area. Each of the rewards may be one point in this case. Points representing rewards to be acquired in a case where the vehicle travels on a next lane representing an ideal travel position in this situation may be further displayed in a superimposed manner on the lane per reward acquisition area. Each of the rewards may be two points in this case. In other words, in a case where the vehicle 1 travels within the range illustrated in FIG. 4, three points may be added as the vehicle keeps traveling on the current lane, and six points may be added as the vehicle travels on the next lane.

Presenting, to the driver, that the driver will be able to acquire more rewards in a case where the vehicle travels on the next lane therefore makes it possible to encourage the driver to change the traveling lane to the next lane. Allowing the driver to acquire more rewards in a case where the vehicle travels on the next lane may further encourage the driver to actively make a lane change to collect data. Appropriately changing points to be displayed makes it possible to repeatedly encourage the driver to make a lane change.

In the example illustrated in FIG. 4, a reward of one point is acquired, as a reward for cooperation in collecting data, even in a case where the vehicle keeps traveling on the current lane. However, no reward may be acquired in a case where the vehicle travels on another lane than a lane with an ideal travel position. In this case, information indicative that no reward is acquired may be presented as a travel position of the vehicle 1 deviates from an ideal travel position. Information indicative of a decreased reward to be acquired may otherwise be presented as a degree of deviation in travel position of the vehicle with respect to an ideal travel position increases. It is therefore possible to encourage the driver to cause the vehicle 1 to move to a travel position where the driver will be able to acquire more points. Points to be displayed may represent points to be actually acquired. Points to be displayed may otherwise be indicated as an identifier for ease of understanding of how much the driver will be able to acquire a reward.

Figure 5:
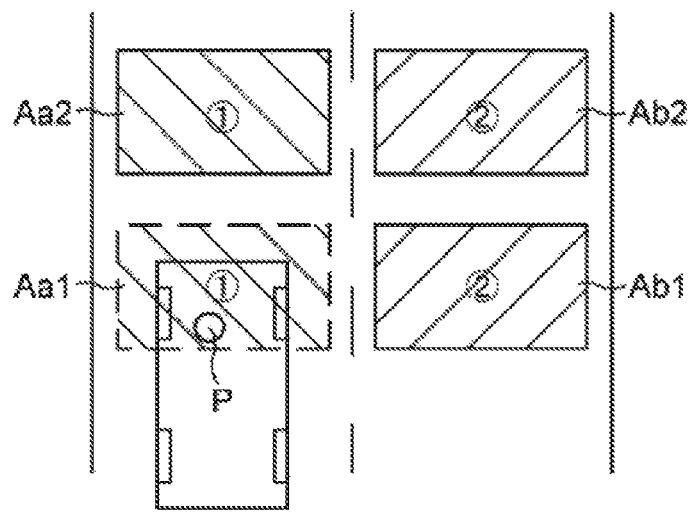
FIG. 5 is a view for description of a method of determining acquisition of a reward.
Figure 6:
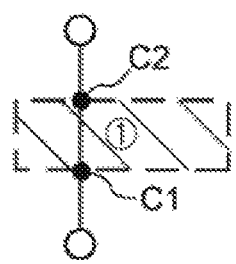
FIG. 6 is a view for description of the method of determining acquisition of a reward.
Figure 7:
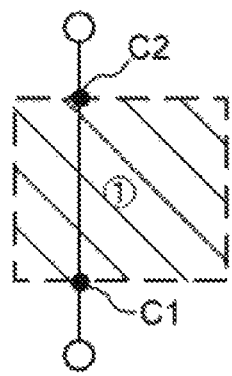
FIG. 7 is a view for description of the method of determining acquisition of a reward.

FIGS. 5 to 7 illustrate an example method of determining acquisition of a reward. As illustrated in FIG. 5, a reference travel position point P may be set on the vehicle 1. The reference travel position point P may represent a position on map data, for example. The reference travel position point P may be detected by the GPS sensor 45. Per each of reward acquisition areas Aa1, Aa2, Ab1, and Ab2, a reward acquisition determination region may be set. The reward acquisition determination region may be set on the map data.

As illustrated in FIG. 6, the data collection unit 67 may determine that a reward is acquired each time the reference travel position point P passes through a reward acquisition determination region being set per reward acquisition area. In other words, the data collection unit 67 may detect an intersection point C1 as the reference travel position point P enters a reward acquisition determination region. The data collection unit 67 may then detect an intersection point C2 as the reference travel position point P exits the reward acquisition determination region. The data collection unit 67 may thus determine that a reward has been acquired. In a case where the vehicle 1 is in the state illustrated in FIG. 5, the reference travel position point P may lie within the reward acquisition determination region of the reward acquisition area Aa1, satisfying one of the reward acquisition conditions. In the state, however, the reference travel position point P has not yet exited the reward acquisition determination region. It is therefore not determined that a reward has been acquired.

In a case where a fact that the reference travel position point P has passed through a reward acquisition determination region is regarded as a condition for determining acquisition of a reward, changing a length of a reward acquisition determination region, i.e., a length in an advancing direction of the vehicle 1, makes it possible to adjust in time the condition for determining acquisition of a reward. Extending a length of a reward acquisition determination region, as illustrated in FIG. 7, for example, makes it possible to extend a period of time until the vehicle acquires one point in a case where the vehicle travels at a constant speed. Note that the method of determining acquisition of a reward may not be limited to the example described above.

In a case of setting a reward acquisition determination region per reward acquisition area, identification information may be allocated to a point to be acquired in each reward acquisition area. This makes it possible to prevent a reward from being acquired in a duplicated manner. An identification (ID) of a newly acquired point may be compared to IDs of already acquired points. In this case, a reward may be added only in a case where an ID of a newly acquired point is not included in the IDs of the already acquired points. In a case where a reward acquisition area has been set wider, it may otherwise be determined whether the vehicle 1 lies within the reward acquisition area, per predetermined time when a travel position of the vehicle 1 is to be detected. As long as the vehicle 1 lies within the reward acquisition area, a reward to be added may increase. In this case, adjusting a time when a travel position of the vehicle 1 is to be detected makes it possible to adjust how a reward will be added. As the vehicle stays longer within a reward acquisition area, a rate at which a reward increases may rise.

Figure 8:
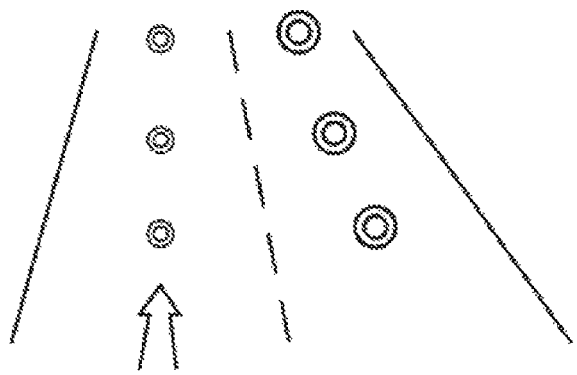
FIG. 8 is an explanatory diagram of an example where, in a case where coins indicative of rewards to be acquired per lane are displayed in a superimposed manner, the coins are varied in size to guide a vehicle.

FIG. 8 illustrates an example where, in a case where coins indicative of rewards to be acquired per lane are displayed in a superimposed manner, the coins are varied in size to guide the vehicle 1. In the example illustrated in FIG. 8, coins indicative of rewards to be acquired in a case where the vehicle keeps traveling on a current lane may be displayed smaller in size than coins indicative of rewards to be acquired in a case where the vehicle travels on a next lane representing an ideal travel position in this situation. Presenting, to the driver, that the driver will be able to acquire more rewards in a case where the vehicle travels on the next lane therefore makes it possible to encourage the driver to change the traveling lane to the next lane. Allowing the driver to acquire more rewards in a case where the vehicle travels on the next lane may further encourage the driver to actively make a lane change to collect data. Appropriately changing in size coins to be displayed makes it possible to repeatedly encourage the driver to make a lane change.

Figure 9:
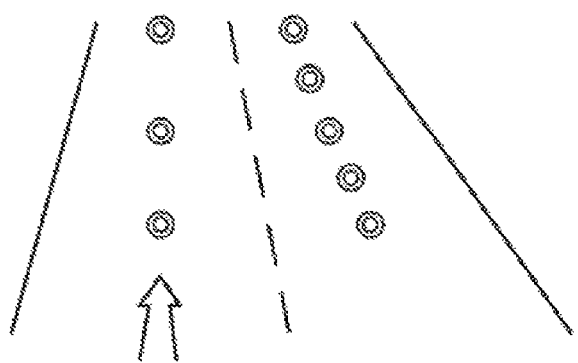
FIG. 9 is an explanatory diagram of an example where, in a case where coins indicative of rewards to be acquired per lane are displayed in a superimposed manner, the coins are varied in number or density to guide a vehicle.

FIG. 9 illustrates an example where, in a case where coins indicative of rewards to be acquired per lane are displayed in a superimposed manner, the coins are varied in number or density to guide the vehicle 1. In the example illustrated in FIG. 9, coins indicative of rewards to be acquired in a case where the vehicle keeps traveling on a current lane may be displayed wider in interval than coins indicative of rewards to be acquired in a case where the vehicle travels on a next lane representing an ideal travel position in this situation. Presenting, to the driver, that the driver will be able to acquire more rewards in a case where the vehicle travels on the next lane therefore makes it possible to encourage the driver to change the traveling lane to the next lane. Allowing the driver to acquire more rewards in a case where the vehicle travels on the next lane may further encourage the driver to actively make a lane change to collect data. Appropriately changing in interval coins to be displayed makes it possible to repeatedly encourage the driver to make a lane change.

Figure 10:
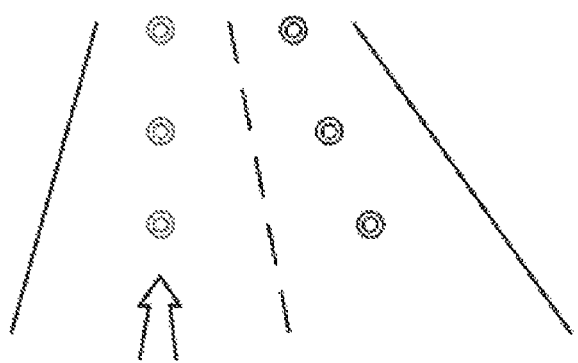
FIG. 10 is an explanatory diagram of an example where, in a case where coins indicative of rewards to be acquired per lane are displayed in a superimposed manner, a display concentration is varied to guide a vehicle.

FIG. 10 illustrates an example where, in a case where coins indicative of rewards to be acquired per lane are displayed in a superimposed manner, a display concentration is varied to guide the vehicle 1. In the example illustrated in FIG. 10, coins indicative of rewards to be acquired in a case where the vehicle keeps traveling on a current lane may be displayed lower in display concentration than coins indicative of rewards to be acquired in a case where the vehicle travels on a next lane representing an ideal travel position in this situation. Presenting, to the driver, that the driver will be able to acquire more rewards in a case where the vehicle travels on the next lane therefore makes it possible to encourage the driver to change the traveling lane to the next lane. Allowing the driver to acquire more rewards in a case where the vehicle travels on the next lane may further encourage the driver to actively make a lane change to collect data. Appropriately changing in display concentration coins to be displayed makes it possible to repeatedly encourage the driver to make a lane change.

Even the examples of the guidance information output controls illustrated in FIGS. 8 to 10 may be applied with the methods of determining acquisition of a reward as described with reference to FIGS. 5 to 7. Displaying rewards themselves as guidance display used to guide the vehicle 1 to an ideal travel position, as described above, makes it possible to entertain the driver during collecting data. It is thus further possible to encourage the driver to actively collect data.

Note that such display that is indicative of a reward may not be limited to a coin, as long as the display may serve as a mark. The method of indicating a difference in reward may not be limited to points and size, display concentration, and density of coins. Coins may be varied in color. A gauge may be displayed. A sound effect may be varied in accordance with a coin to be acquired. For example, in a case where a vehicle travels at a position closer to an ideal travel position, such a sound effect may be provided that more pleases a driver. As the vehicle travels away from the ideal travel position, the sound effect may be changed to less please the driver. The display used to guide the vehicle 1 to an ideal travel position may not indicate a reward.

Figure 11:
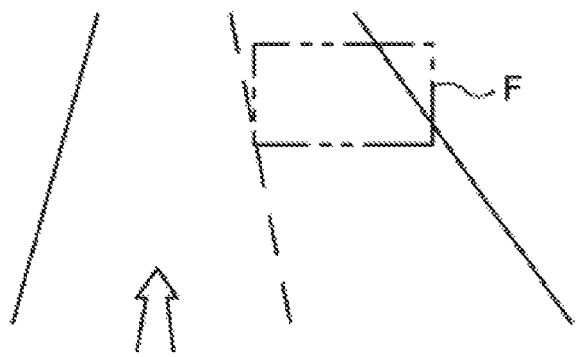
FIG. 11 is an explanatory diagram of an example where a frame indicative of an ideal travel position is displayed in a superimposed manner on a lane.
Figure 12:
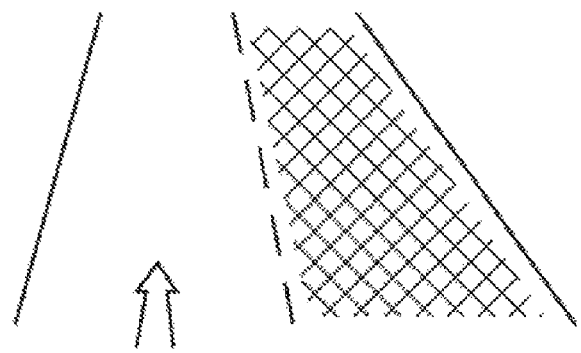
FIG. 12 is an explanatory diagram of an example where a pattern or a color is displayed in a superimposed manner on a lane on which a vehicle should travel.

FIGS. 11 to 12 illustrate examples where an ideal travel position is displayed in a superimposed manner, without rewards, on a road to guide the vehicle 1. FIG. 11 illustrates one of the examples, where a frame indicative of an ideal travel position is displayed in a superimposed manner on a lane. In the example illustrated in FIG. 11, a frame F indicative of an ideal travel position may be displayed on the lane next to a lane on which the vehicle is currently traveling. FIG. 12 illustrates another one of the examples, where a pattern or a color is displayed in a superimposed manner on a lane on which the vehicle should travel. In the example illustrated in FIG. 12, a pattern may be displayed on the lane next to a lane on which the vehicle is currently traveling.

It is therefore possible to encourage the driver to change the traveling lane to the next lane. Since the driver understands that the driver will be able to acquire more rewards in a case where the vehicle travels at a designated travel position, the driver may be encouraged to actively make a lane change to collect data. Appropriately changing in display position the frame F, the pattern, or the color to be displayed makes it possible to repeatedly encourage the driver to make a lane change. In a case where a patterned or colored ideal travel position is to be displayed, the position may be varied in pattern density, color, or color concentration, in accordance with a degree of how much the vehicle is closer to the ideal travel position. It is thus further possible to encourage the driver to actively cause the vehicle 1 to travel at a position closer to an ideal travel position, increasing data collection efficiency.

FIGS. 4 to 12 have illustrated the examples of how the vehicle 1 traveling on the road separated into the plurality of lanes is guided to a desired lane. The examples may also be applied to a case where the vehicle 1 is guided to a desired position, i.e., a position in a width direction of a road, within a predetermined lane.

[4.2. Example of Guidance to Ideal Travel Position Spaced Desired Inter-Vehicle Distance]

As described above, it may be necessary that, in a case where data that a requester wants to collect is data of air resistance or aerodynamic characteristics of a vehicle body or data of information of emotional or biological conditions of an occupant or a driver, for example, during a period of time within which the vehicle follows a preceding vehicle, a travel position of the vehicle 1 be guided to a position spaced a predetermined inter-vehicle distance with respect to the preceding vehicle. FIGS. 13 to 18 illustrate examples of presentations, where the vehicle 1 is guided to a position spaced a desired inter-vehicle distance with respect to a preceding vehicle.

Figure 13:
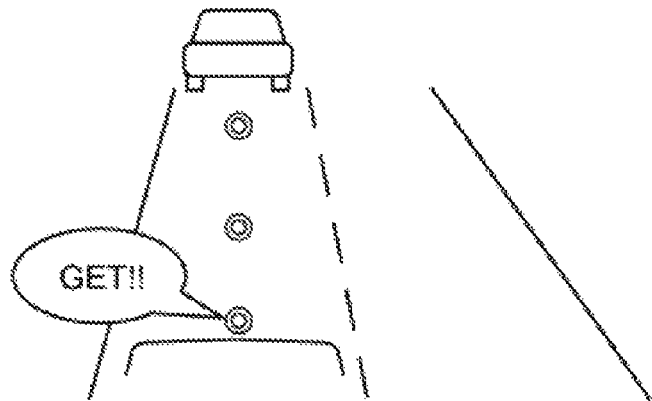
FIG. 13 is an explanatory diagram of an example of superimposed display, illustrating a case where an inter-vehicle distance with respect to a preceding vehicle falls within an appropriate range.
Figure 14:
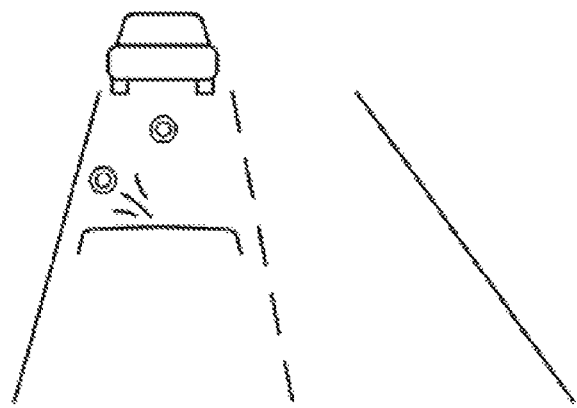
FIG. 14 is an explanatory diagram of an example of superimposed display, illustrating a case where an inter-vehicle distance with respect to a preceding vehicle is too short.
Figure 15:
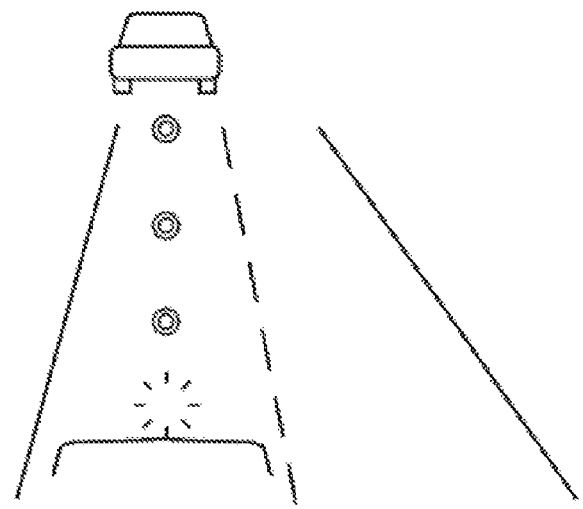
FIG. 15 is an explanatory diagram of an example of superimposed display, illustrating a case where an inter-vehicle distance with respect to a preceding vehicle is too long.

FIGS. 13 to 15 illustrate examples where a display mode of coins to be displayed in a superimposed manner may be varied in accordance with an inter-vehicle distance with respect to a preceding vehicle to guide the vehicle 1 to a position spaced a desired inter-vehicle distance. FIG. 13 illustrates an example of superimposed display, where an inter-vehicle distance with respect to a preceding vehicle falls within an appropriate range. FIG. 14 illustrates an example of superimposed display, where an inter-vehicle distance with respect to a preceding vehicle is too short. FIG. 15 illustrates an example of superimposed display, where an inter-vehicle distance with respect to a preceding vehicle is too long.

In a case where an inter-vehicle distance with respect to a preceding vehicle falls within an appropriate range, and the vehicle 1 passes through a position where a coin is displayed, as illustrated in FIG. 13, a message "GET!!" may be displayed. In a case where an inter-vehicle distance with respect to a preceding vehicle is too short, and the vehicle 1 travels at a position where a coin is displayed, as illustrated in FIG. 14, the displayed coin may be flipped. In a case where an inter-vehicle distance with respect to a preceding vehicle is too long, and before the vehicle 1 arrives at a position where a coin is displayed, as illustrated in FIG. 15, the displayed coin may disappear. Such display that a coin is flipped or disappears may be an example of information indicative that a travel position of the vehicle 1 is off an ideal travel position, in which case no reward will be acquired. Instead of or in addition to presenting information indicative that no reward will be acquired, information indicative of a decreased reward to be acquired may otherwise be presented as a degree of deviation in travel position of the vehicle 1 with respect to an ideal travel position increases.

It is therefore possible to encourage the driver to actively accelerate or decelerate the vehicle 1 to keep an inter-vehicle distance allowing the vehicle 1 to acquire coins. As the driver will be able to acquire rewards as long as the driver keeps an inter-vehicle distance falling within an appropriate range, the driver may be encouraged to actively adjust acceleration and deceleration of the vehicle 1 to collect data. It is possible to measure an inter-vehicle distance with respect to a preceding vehicle, on the basis of data detected by a LIDAR, for example.

Figure 16:
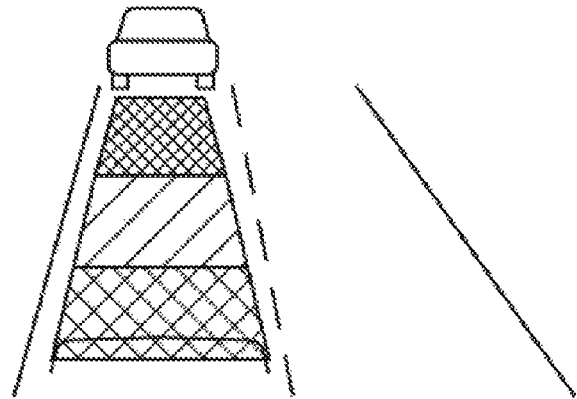
FIG. 16 is an explanatory diagram of an example where, among a region where an inter-vehicle distance with respect to a preceding vehicle is too short, a region where the inter-vehicle distance with respect to the preceding vehicle falls within an appropriate range, and a region where the inter-vehicle distance with respect to the preceding vehicle is too long, displayed patterns or colors are varied.
Figure 17:
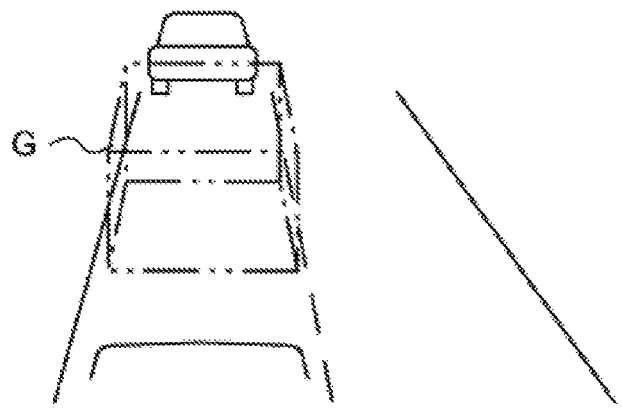
FIG. 17 is an explanatory diagram of an example where, in a region where an inter-vehicle distance with respect to a preceding vehicle falls within an appropriate range, a gate G is displayed in a superimposed manner.
Figure 18:
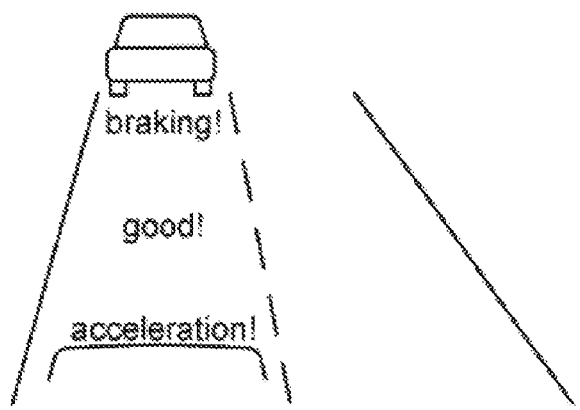
FIG. 18 is an explanatory diagram of an example where, among a region where an inter-vehicle distance with respect to a preceding vehicle is too short, a region where the inter-vehicle distance with respect to the preceding vehicle falls within an appropriate range, and a region where the inter-vehicle distance with respect to the preceding vehicle is too long, different messages are displayed.

Note that such display that guides the vehicle 1 to a position spaced a desired inter-vehicle distance with respect to a preceding vehicle may not indicate a reward. FIGS. 16 to 18 illustrate examples where an ideal travel position is displayed in a superimposed manner, without rewards, on a road to guide the vehicle 1. FIG. 16 illustrates an example where, among a region where an inter-vehicle distance with respect to a preceding vehicle is too short, a region where the inter-vehicle distance with respect to the preceding vehicle falls within an appropriate range, and a region where the inter-vehicle distance with respect to the preceding vehicle is too long, displayed patterns or colors are varied. FIG. 17 illustrates an example where, in a region where an inter-vehicle distance with respect to a preceding vehicle falls within an appropriate range, a gate G is displayed in a superimposed manner. FIG. 18 illustrates an example where, among a region where an inter-vehicle distance with respect to a preceding vehicle is too short, a region where the inter-vehicle distance with respect to the preceding vehicle falls within an appropriate range, and a region where the inter-vehicle distance with respect to the preceding vehicle is too long, different messages are displayed. In a specific but non-limiting example, a message "good!" may be displayed, in a case where the vehicle 1 travels at a position spaced an appropriate inter-vehicle distance. A message "braking!" may be displayed, in a case where the vehicle 1 travels at an inter-vehicle distance that is too short. Otherwise, a message "acceleration!" may be displayed, in a case where the vehicle 1 travels at an inter-vehicle distance that is too long.

It is therefore possible to encourage the driver to actively cause the vehicle to travel at a position spaced a desired inter-vehicle distance. Since the driver understands that the driver will be able to acquire more rewards in a case where the vehicle travels at a position spaced an appropriate inter-vehicle distance, the driver may be encouraged to actively adjust an inter-vehicle distance to collect data. In a case where a patterned or colored ideal travel position is to be displayed, the position may be varied in pattern density, color, or color concentration in accordance with a degree of how much the vehicle is closer to the ideal travel position. It is thus further possible to encourage the driver to actively adjust an inter-vehicle distance with respect to a preceding vehicle closer to a desired inter-vehicle distance, increasing data collection efficiency.

[5. Operation]

The configuration examples of the management server 10 and the on-vehicle information processing device 50 of the data collection system according to the example embodiment have been described. Examples of how the management server 10 and the on-vehicle information processing device 50 respectively operate will now be described appropriately with reference to flowcharts.

[5.1. Example Processing Flow of Management Server]

Figure 19:
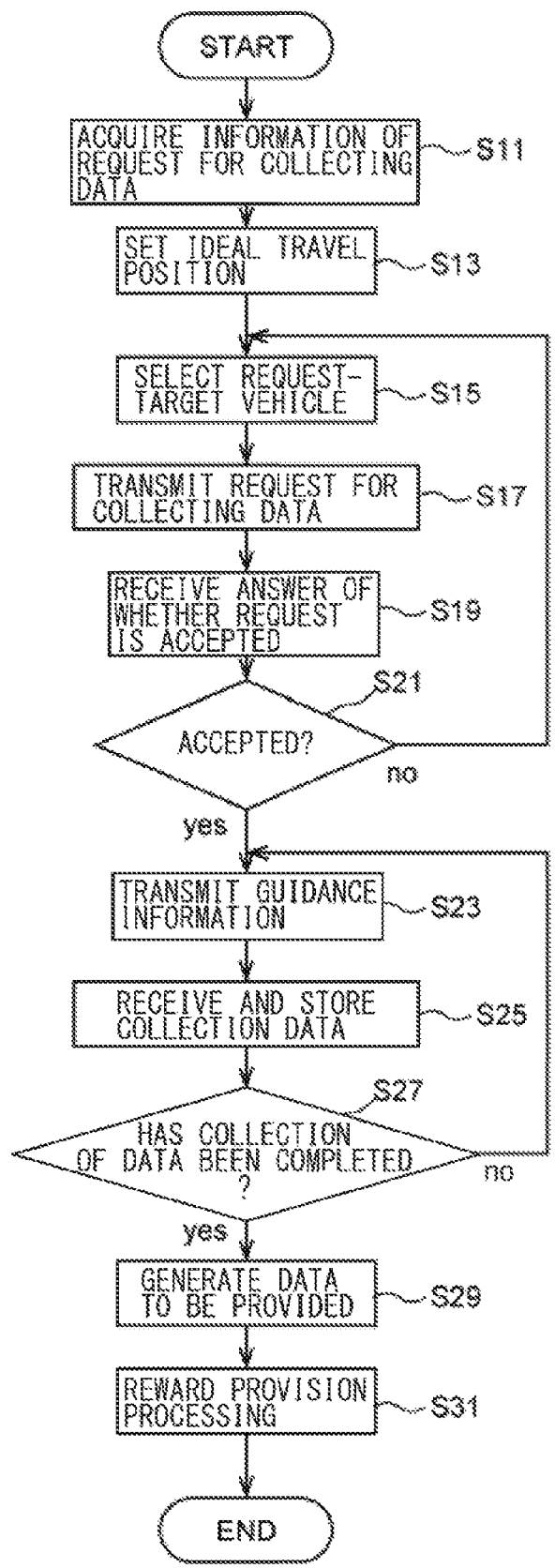
FIG. 19 is an explanatory diagram of a processing flow of how the management server operates.

An example processing flow of how the management server 10 operates will first be described with reference to FIG. 19.

The data acquisition unit 21 of the management server 10 may acquire information of a request for collecting desired data, after the request has been transmitted from the requester-side terminal 30 (step S11). How to acquire a request for collecting data is not limited to the example where such a request is acquired from a requester-side terminal via the communication network 3. A request may be directly entered by the administrator of the management server 10, for example. The data acquisition unit 21 may store, in the storage 15, the acquired information of the request for collecting data.

Next, the travel position setting unit 23 of the management server 10 may set an ideal travel position for the vehicles 1 in accordance with a content of the data that a requester wants (step S13). In the above described example according to the example embodiment, the travel position setting unit 23 may set, in accordance with the data that the requester wants, a desired travel position within one lane or desired travel positions within a plurality of lanes. The travel position setting unit 23 may otherwise set an ideal travel position at which an inter-vehicle distance with respect to a preceding vehicle falls within an appropriate range.

Next, the guidance information output unit 25 of the management server 10 may select one of the vehicles 1, in a case where the one satisfies conditions for collecting the data that the requester wants (step S15). For example, the guidance information output unit 25 may refer to vehicle information transmitted from each of the vehicles 1, such as vehicle type, current position, attributes of a driver, and specifications of sensors, to select one of the vehicles 1, in a case where the one satisfies the conditions for collecting data. One or a plurality of vehicles 1 may be selected.

Next, the guidance information output unit 25 may transmit, to the selected vehicle 1, the information of the request for collecting data (step S17). The guidance information output unit 25 may transmit information of the necessary collection data, travel conditions, and rewards, for example, causing a driver or an occupant of the vehicle 1 to decide whether the driver or the occupant accepts the request for collecting data.

Next, the guidance information output unit 25 may receive, from the vehicle 1 to which the information of the request for collecting data has been transmitted, an answer of whether the driver or the occupant has accepted the request (step S19). Next, the guidance information output unit 25 may determine whether the driver or the occupant of the vehicle 1 has accepted the collection of data, on the basis of the received answer (step S21). In a case where the driver or the occupant has denied the collection of data (S21/No), the flow may return to step S15. The guidance information output unit 25 may then select another one of the vehicles 1 to which collection of data is to be requested.

In a case where the driver or the occupant has accepted the collection of data (S21/Yes), the guidance information output unit 25 may transmit, to the vehicle 1, guidance information used to guide the vehicle 1 to the ideal travel position (step S23). In the example embodiment, the guidance information output unit 25 may transmit, to the vehicle 1, the guidance information, together with reward information. Guidance information may be transmitted only once before collection of data starts. Guidance information may otherwise be transmitted per predetermined processing cycle. For example, how quickly the management server 10 processes calculations or how frequently the management server 10 adds rewards may be taken into account to set a time when guidance information is to be transmitted.

Next, the collection data processing unit 27 of the management server 10 may receive collection data transmitted from the vehicle 1. The collection data processing unit 27 may then store the data in the storage 15 (step S25). In a case where the received collection data represents detection data of various kinds of sensors provided in the vehicle 1, the collection data processing unit 27 may convert the detection data into data that a requester wants. The collection data processing unit 27 may then store the data in the storage 15.

Next, the collection data processing unit 27 may determine whether the collection of data has been completed (step S27). For example, the collection data processing unit 27 may determine whether the collection of data has been completed, on the basis of a content or an amount of data that a requester wants, or of a period of time within which the data is to be collected, for example. The collection data processing unit 27 may otherwise determine whether the collection of data has been completed, on the basis of whether the vehicle 1 to which the collection of data has been requested at this time has finished the collection of data. In a case where the collection of data has not yet been completed (S27/No), the guidance information output unit 25 may continuously transmit the guidance information.

In a case where the collection of data has been completed (S27/Yes), the collection data processing unit 27 may generate data to be provided to the requester (step S29). Data to be provided may be appropriately generated in accordance with a content of data that a requester wants. The generated data may be provided to the requester, via the communication network 3 or a storage medium onto which the data is written, for example. The methods of providing the generated data may not be particularly limited.

Next, the reward processing unit 29 may execute processing of providing a reward to the acceptor having collected the data (step S31). For example, the reward processing unit 29 may refer to a total count of rewards included in the collection data transmitted from the vehicle 1. The reward processing unit 29 may then provide the rewards to the acceptor in accordance with the total count. A specific but non-limiting example method of providing a reward may not be particularly limited. An existing point system or billing system may be appropriately utilized, for example.

[5.2. Example Processing Flow of On-Vehicle Information Processing Device]

Figure 20:
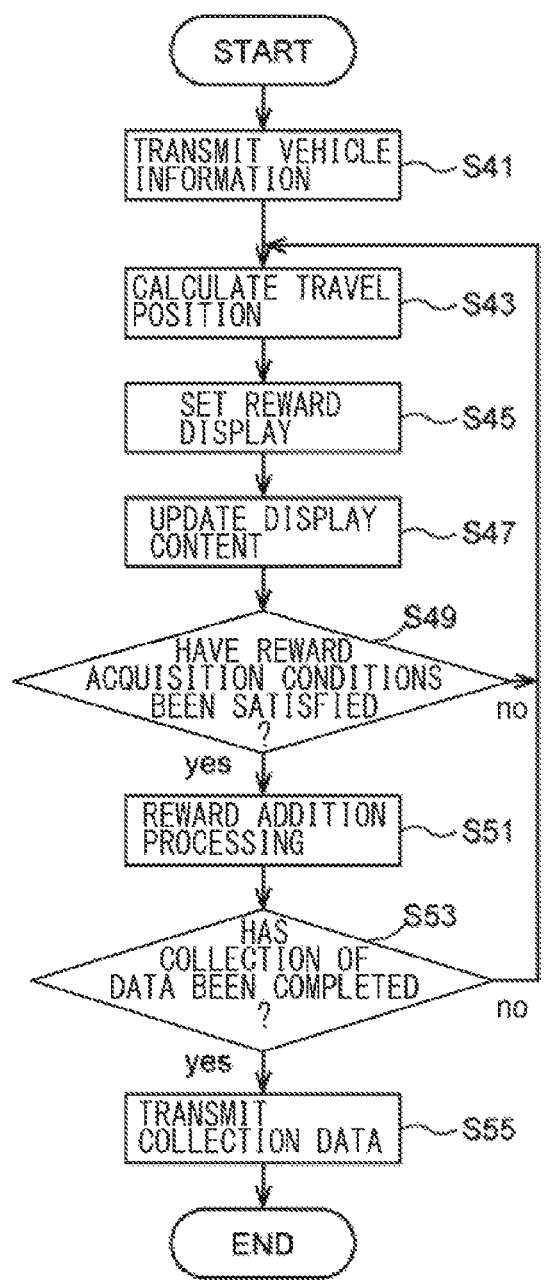
FIG. 20 is an explanatory diagram of a processing flow of how the on-vehicle information processing device operates.

Next, an example processing flow of how the on-vehicle information processing device 50 operates will now be described with reference to FIG. 20.

The transmission control unit 71 of the on-vehicle information processing device 50 may first transmit vehicle information, via the wireless communication network 5, to the management server 10 (step S41). Vehicle information may include information of at least one of vehicle type, current position, attributes of a driver, and specifications of sensors. Vehicle information may be transmitted per sampling rate. Vehicle information may otherwise be transmitted at predetermined frequency by taking into account how quickly the controller 53 processes calculations or how frequently the controller 53 adds rewards.

Next, the data collection unit 67 of the on-vehicle information processing device 50 may calculate a current travel position of the vehicle 1 (step S43). For example, the data collection unit 67 may estimate a current position of the vehicle 1 on the map data, on the basis of a sensor signal of the GPS sensor 45.

Next, the presentation control unit 65 of the on-vehicle information processing device 50 may set a content of a reward to be displayed on the information presentation unit 47, on the basis of guidance information that the guidance information acquisition unit 63 has acquired from the management server 10, as well as on the basis of the current travel position of the vehicle 1 (step S45). For example, the presentation control unit 65 may set a content of a reward in a case where the content is to be displayed in a superimposed manner on an HUD device, in accordance with the example presentation control described above.

Next, the presentation control unit 65 may update the content displayed on the information presentation unit 47 (step S47). In a specific but non-limiting example, positions, points, sizes, colors, display concentrations, or density of coins used to guide the vehicle 1 to an ideal travel position, for example, may be changed, in accordance with the guidance information acquired from the management server 10 and the content of the reward that is set in step S45.

Next, the data collection unit 67 may determine whether the vehicle 1 satisfies reward acquisition conditions (step S49). For example, the data collection unit 67 may determine whether the vehicle 1 satisfies the reward acquisition conditions, in accordance with the above described example of determining acquisition of a reward. In a case where the vehicle 1 does not satisfy the reward acquisition conditions (S49/No), the flow may return to step S43 to repeat the processing described above.

In a case where the vehicle 1 satisfies the reward acquisition conditions (S49/Yes), the data collection unit 67 may execute processing of adding a reward (step S51). The data collection unit 67 may add, for example, points allocated in accordance with reward information transmitted from the management server 10. In a case where the vehicle 1 satisfies the reward acquisition conditions, such a control may be performed that provides a sound effect or a display effect, or that causes a lamp to come on, together with the addition of the reward, to notify to the driver that the driver has now acquired the reward, for example. It is therefore possible to entertain the driver through acquisition of a reward, encouraging the driver to actively collect data.

Next, the data collection unit 67 may determine whether the collection of data has been completed (step S53). For example, the data collection unit 67 may determine whether the collection of data has been completed by determining whether the vehicle 1 travels past an area where the vehicle 1 is able to acquire a reward, or by determining whether the driver or the occupant has performed an input operation indicative of completion of the collection of data. In a case where the collection of data has not yet been completed (S53/No), the flow may return to step S43 to repeat the processing described above. In a case where the collection of data has been completed (S53/Yes), the transmission control unit 71 may transmit collected data to the management server 10 via the wireless communication network 5 (step S55).

Collected data may however not be collectively transmitted upon completion of the collection of data. Collected data may be transmitted at appropriate frequency or at an appropriate timing.

In the data collection system according to the example embodiment, as described above, the management server 10 may set an ideal travel position in accordance with collection data that a requester wants. The management server 10 may then generate guidance information used to guide a vehicle, on the basis of the ideal travel position. The management server 10 may thus transmit the guidance information to the on-vehicle information processing device 50. The on-vehicle information processing device 50 having received the guidance information may present information used to guide the vehicle 1 to the ideal travel position on the basis of the guidance information. It is therefore possible to allow the driver to easily perform a driving operation of causing a travel position of the vehicle 1 to be closer to an ideal travel position. This makes it possible to increase efficiency of collecting data satisfying a request provided by a requester.

The data collection system according to the example embodiment may present reward information serving as information used to guide the vehicle 1 to an ideal travel position, making it possible to allow the driver to recognize a reward that the driver will be able to acquire. Such presentation makes it possible to encourage the driver to actively collect data, increasing data collection efficiency.

Generating a sound effect or changing a display effect as the vehicle 1 travels and acquires a reward further makes it possible to entertain the driver in collecting data. It is thus possible to easily allow the driver to be actively involved in collection of data, further increasing data collection efficiency.

Some example embodiments of the disclosure have been described in detail with reference to the accompanying drawings. However, the disclosure is not limited to the example embodiments. It is apparent that persons skilled in the technical field of the disclosure may perceive various modification examples or alteration examples within the scope of the technical concept as defined by the following claims. It should be appreciated that the various modification examples or alteration examples obviously fall within the technical scope of the disclosure.

In the data collection system according to the example embodiment described above, for example, the on-vehicle information processing device 50 may serve as a control device mounted in the vehicle 1. Furthermore, the information presentation unit 47 may serve as an HUD device provided in the vehicle 1. However, the disclosure is not limited to the example embodiment. For example, the on-vehicle information processing device 50 may be a portable device to be carried by an occupant of the vehicle 1. In this case, the portable device may be configured to communicate with the control device of the vehicle 1 via wireless communications or short-range communications conforming to Bluetooth (registered trademark) or other standards. In this case, the information presentation unit 47 may be a display screen of the portable device.

In the data collection system according to the example embodiment described above, the control device exemplified as a cloud server has been described to serve as the information processing device including the travel position setting unit and the guidance information output unit. However, the on-vehicle information processing device 50 may also fall within the scope of the information processing device according to at least one embodiment of the disclosure. Some of the configurations provided as described above may be switched between the management server 10 and the on-vehicle information processing device 50 of the data collection system according to the example embodiment. In particular, the on-vehicle information processing device 50 may also take a role of the management server 10.

In the data collection system according to the example embodiment described above, an image or a video may be displayed to guide the vehicle 1 to an ideal travel position. However, a voice guidance may be provided, for example.

In the example embodiment described above, the vehicle 1 has been described as a vehicle to be manually operated. However, the disclosure is not limited to the example embodiment. Even if the vehicle 1 represents such a vehicle that is to be driven in an automated manner, it is possible that an operator of the vehicle is encouraged to be actively involved in collection of data. It is thus further possible that the operator of the vehicle easily accepts a request for collecting data, increasing data collection efficiency.

One or more of the controller 13 and the controller 53 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 13 and the controller 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 13 and the controller 53 illustrated in FIGS. 2 and 3.

The invention claimed is:

1. An information processing device to be used in a data collection system configured to collect data to be acquired during traveling of a vehicle, the information processing device comprising:
    a travel position setting unit configured to set, based on a request of a requester for collecting the data, a reward acquisition area for the vehicle to travel within;
    a guidance information output unit configured to output, based on the reward acquisition area for the vehicle, guidance information used to guide the vehicle to be within the reward acquisition area;
    a data acquisition unit configured to collect the data while the vehicle travels within the reward acquisition area; and
    a reward processing unit configured to pay a reward to a user of the vehicle in response to collecting the data,
    wherein the reward increases as a period of time that the vehicle travels within the reward acquisition area increases,
    wherein the data acquisition unit is configured to acquire an inter-vehicle distance from a preceding vehicle to the vehicle based on a detection result of a sensor provided on the vehicle,
    wherein the guidance information output unit is configured to cause the vehicle to display, in a superimposed manner, the information of the reward on the travel position within a field of vision of a driver of the vehicle, and
    wherein the guidance information output unit is configured to change a display of the information of the reward based on i) determining whether the inter-vehicle distance falls within a predetermined range; and determining whether the vehicle passes through a position where the information of the reward is displayed in the field of vision of the driver of the vehicle.

2. The information processing device according to claim 1, wherein the guidance information output unit causes the vehicle to present information of the reward as the guidance information.

3. The information processing device according to claim 2, wherein the guidance information output unit causes the vehicle to display, in a superimposed manner, the information of the reward on the reward acquisition area within the field of vision of the driver of the vehicle.

4. The information processing device according to claim 3, wherein the reward acquisition area includes an ideal travel position, the ideal travel position represents a predetermined travel position within one lane or predetermined travel positions within a plurality of lanes, and the guidance information output unit causes the vehicle to display, in a superimposed manner, the information of the reward on the travel position or the travel positions within the field of vision of the driver of the vehicle.

5. The information processing device according to claim 3, wherein the reward acquisition area includes an ideal travel position, the ideal travel position represents a travel position for the vehicle to be spaced apart for spaced the inter-vehicle distance from the preceding vehicle in front of the vehicle, and the guidance information output unit causes the vehicle to display, in a superimposed manner, the information of the reward on the travel position within the field of vision of the driver of the vehicle.

6. The information processing device according to claim 1, wherein the reward acquisition area includes an ideal travel position, and in a case where a travel position of the vehicle deviates from the ideal travel position, the guidance information output unit causes the vehicle to present information indicative that the reward will be unable to be acquired.

7. The information processing device according to claim 2, wherein the reward acquisition area includes an ideal travel position, and in a case where a travel position of the vehicle deviates from the ideal travel position, the guidance information output unit causes the vehicle to present information indicative that the reward will be unable to be acquired.

8. The information processing device according to claim 3, wherein the reward acquisition area includes an ideal travel position, and in a case where a travel position of the vehicle deviates from the ideal travel position, the guidance information output unit causes the vehicle to present information indicative that the reward will be unable to be acquired.

9. The information processing device according to claim 4, wherein the reward acquisition area includes an ideal travel position, and in a case where a travel position of the vehicle deviates from the ideal travel position, the guidance information output unit causes the vehicle to present information indicative that the reward will be unable to be acquired.

10. The information processing device according to claim 5, wherein the reward acquisition area includes an ideal travel position, and in a case where a travel position of the vehicle deviates from the ideal travel position, the guidance information output unit causes the vehicle to present information indicative that the reward will be unable to be acquired.

11. The information processing device according to claim 1, wherein the reward acquisition area includes an ideal travel position, and the guidance information output unit causes the vehicle to present information indicative of a decrease in the reward as a degree of deviation in travel position of the vehicle with respect to the ideal travel position increases.

12. The information processing device according to claim 2, wherein the reward acquisition area includes an ideal travel position, and the guidance information output unit causes the vehicle to present information indicative of a decrease in the reward as a degree of deviation in travel position of the vehicle with respect to the ideal travel position increases.

13. The information processing device according to claim 3, wherein the reward acquisition area includes an ideal travel position, and the guidance information output unit causes the vehicle to present information indicative of a decrease in the reward as a degree of deviation in travel position of the vehicle with respect to the ideal travel position increases.

14. The information processing device according to claim 4, wherein the reward acquisition area includes an ideal travel position, and the guidance information output unit causes the vehicle to present information indicative of a decrease in the reward as a degree of deviation in travel position of the vehicle with respect to the ideal travel position increases.

15. The information processing device according to claim 5, wherein the reward acquisition area includes an ideal travel position, and the guidance information output unit causes the vehicle to present information indicative of a decrease in the reward as a degree of deviation in travel position of the vehicle with respect to the ideal travel position increases.

16. The information processing device according to claim 1, wherein a rate at which the reward increases rises as the period of time that the vehicle travels within the reward acquisition area increases.

17. The information processing device according to claim 1, wherein the guidance information output unit is configured to:

display, in a case where the inter-vehicle distance falls within the predetermined range and the vehicle passes through the position where the information of the reward is displayed in the field of vision of the driver of the vehicle, a message representing that the driver has got the reward is displayed, flip, in a case where the inter-vehicle distance is too short to fall within the predetermined range and the vehicle travels at the position where the information of the reward is displayed in the field of vision of the driver of the vehicle, the displayed information of the reward, and cause, in a case where the inter-vehicle distance is too long to fall within the predetermined range and before the vehicle arrives at the position where the information of the reward is displayed in the field of vision of the driver of the vehicle, the displayed information of the reward to disappear.

18. An information processing device to be used in a data collection system configured to collect data to be acquired during traveling of a vehicle, the information processing device being mountable in the vehicle, the information processing device comprising:
- a processor configured to function as:
  - a guidance information acquisition unit configured to acquire guidance information used to guide the vehicle to be within a reward acquisition area, the reward acquisition area being set based on a request of a requester for collecting the data; and
  - a presentation control unit configured to present i) the guidance information acquired by the guidance information acquisition unit and ii) a reward to be paid to a user of the vehicle with respect to data collected while the vehicle travels within the reward acquisition area,
- wherein the reward increases as a period of time that the vehicle travels within the reward acquisition area increases,
- wherein the data collection system is configured to acquire an inter-vehicle distance from a preceding vehicle to the vehicle based on a detection result of a sensor provided on the vehicle,
- wherein the presentation control unit is configured to cause the vehicle to display, in a superimposed manner, the information of the reward on the travel position within a field of vision of a driver of the vehicle, and
- wherein the presentation control unit is configured to change a display of the information of the reward based on i) determining whether the inter-vehicle distance falls within a predetermined range; and determining whether the vehicle passes through a position where the information of the reward is displayed in the field of vision of the driver of the vehicle.

19. A data collection system configured to collect data to be acquired during traveling of a vehicle, the data collection system comprising:
- a management server; and
- an information processing device mountable in the vehicle,
- wherein the management server includes a controller that functions as:
  - a data acquisition unit configured to acquire a request of a requester for collecting the data;
  - a guidance information output unit configured to transmit, to the information processing device, guidance information used to guide the vehicle to be within a reward acquisition area, the reward acquisition area being set on a basis of the request for collecting the data;
  - a storage configured to store the collected data transmitted from the vehicle; and
  - a reward processing unit configured to pay a reward to a user of the vehicle in response to collecting the data,
- wherein the reward increases as a period of time that the vehicle travels within the reward acquisition area increases,
- wherein the information processing device includes a processor that functions as:
  - a guidance information acquisition unit configured to acquire the guidance information from the guidance information output unit of the management server,
  - a presentation control unit configured to present i) the guidance information used to guide the vehicle toward the reward acquisition area, and
  - a transmission control unit configured to transmit, to the management server, the data collected while the vehicle travels within the reward acquisition area,
- wherein the data acquisition unit is configured to acquire an inter-vehicle distance from a preceding vehicle to the vehicle based on a detection result of a sensor provided on the vehicle,
- wherein the guidance information output unit is configured to cause the vehicle to display, in a superimposed manner, the information of the reward on the travel position within a field of vision of a driver of the vehicle, and
- wherein the guidance information output unit is configured to change a display of the information of the reward based on i) determining whether the inter-vehicle distance falls within a predetermined range; and determining whether the vehicle passes through a position where the information of the reward is displayed in the field of vision of the driver of the vehicle.

\* \* \* \* \*